United States Patent [19]

Kasahara et al.

[11] Patent Number: 4,975,486

[45] Date of Patent: Dec. 4, 1990

[54] HIGH-GLOSS RUBBER-REINFORCED POLYSTYRENE COMPOSITION AND METHOD FOR CONTINUOUS PRODUCTION THEREOF

[75] Inventors: Hideo Kasahara, Yokosuka; Akifumi Tohara, Yokohama, both of Japan

[73] Assignee: Asahi Kasei Kogyo Kabushiki Kaisha, Osaka, Japan

[21] Appl. No.: 303,066

[22] Filed: Jan. 30, 1989

Related U.S. Application Data

[63] Continuation of Ser. No. 921,190, Oct. 21, 1986, abandoned.

[30] Foreign Application Priority Data

Oct. 22, 1985 [JP] Japan .................................. 60-234480
Jul. 28, 1986 [JP] Japan .................................. 61-175524

[51] Int. Cl.$^5$ ..................... C08L 47/00; C08L 51/04; C08L 83/04
[52] U.S. Cl. ..................................... 525/72; 524/506; 524/730; 525/64; 525/68; 525/105; 525/106
[58] Field of Search .................. 524/730, 506; 525/68, 525/105, 106, 72

[56] References Cited

U.S. PATENT DOCUMENTS 3,398,214  8/1968  Roper et al. ........................ 260/876
4,248,778  2/1981  Arnold et al. ....................... 524/311

FOREIGN PATENT DOCUMENTS 57-187345  11/1982  Japan .
57-187346  11/1982  Japan .

*Primary Examiner*—Jacob Ziegler
*Attorney, Agent, or Firm*—Armstrong, Nikaido, Marmelstein, Kubovcik & Murray

[57] ABSTRACT

This invention relates to a rubber-reinforced polystyrene composition having a rubbery polymer dispersed in the form of particles therein, characterized in that:

(A) the particles have an area-averaged particle diameter in the range of 0.20 to 1.00 micron, (B) the dispersed particles of rubbery substance have polystyrene included in the form of minute particles therein and not less than 80% of the total number of the polystyrene particles have diameters of not more than 0.3 micron, and (C) the composition contains polydimethyl siloxane in an amount falling in the range of 0.005 to 0.8% by weight.

The resin composition of this invention is superior in appearance such as coloring and gloss and has balanced properties of impact resistance and rigidity. Excellent coloring represents a profound commercial significance in that the cost of dye and pigment to be used for the coloring can be appreciably saved.

4 Claims, No Drawings

HIGH-GLOSS RUBBER-REINFORCED POLYSTYRENE COMPOSITION AND METHOD FOR CONTINUOUS PRODUCTION THEREOF

This application is a continuation of application Ser. No. 921,190, filed Oct. 21, 1986, now abandoned.

BACKGROUND OF THE INVENTION:

1. Field of the Invention:

This invention relates to a method for continuous production of a rubber-reinforced polystyrene type resin possessing a balanced set of outstanding properties.

Rubber-reinforced polystyrene, for example, is now used extensively in parts for household electric appliances. It nevertheless has the disadvantage that the molded articles thereof are deficient in surface gloss, in impact strength, and in colored feeling as compared with those of the conventional ABS resin. Recently, in view of the trend of the molded articles of rubber-reinforced polystyrene type resins toward reduction of cost and decrease of wall thickness, the market has been demanding the appearance of a rubber-reinforced polystyrene composition which exhibits properties similar to those of the ABS resin.

As the general trend of the recent techniques concerning the production of rubber-reinforced polystyrene, the method of continuous bulk polymerization which gives products of highly stable quality at low cost has come to attract increasing attention in view of reduction of cost.

This invention aims to provide a rubber-reinforced polystyrene type resin composition which is inexpensive and yet is capable of producing molded articles possessing a balanced set of outstanding properties such as gloss, coloring, and impact strength comparable to those exhibited by injection molded articles, extruded sheets, and extrusion vacuum molded articles of the expensive ABS resin and a method for the continuous production, particularly a method for the continuous bulk polymerization, of the rubber-reinforced polystyrene type resin composition.

2. Description of the Prior Art:

The rubber-reinforced polystyrene has heretofore been used extensively on a commercial scale. The rubber particles dispersed in the rubber-reinforced polystyrene have diameters generally falling in the range of 1.0 to 5.0 microns ($\mu$). When the rubber-reinforced polystyrene contains rubber particles of diameters not exceeding 1.0 $\mu$, it does not exhibit desirable properties.

The rubber-reinforced polystyrene generally has polystyrene included in the form of minute particles within the dispersed particles of rubbery substance. It is clearly noted from the electron microscope photographs of commercially available rubber-reinforced polystyrene products inserted as FIG. 2 in "Encyclopedia of Polymer Science and Technology," Vol. 13, page 402 that in all the included polystyrene particles of a given rubber-reinforced polystyrene product, those of diameters exceeding 0.3 $\mu$ account for a fairly large proportion.

Resin compositions which comprise a rubber-reinforced styrene type resin and an organic polysiloxane are described in such prior publications as "Modern Plastics," November, 1972 issue, pp 114–116, "Plastics Age," 1974, Vol. 20, May issue, page 107, Japanese Patent Application Laid-open No. 3494/1980, Japanese Patent Application Laid-open No. 124561/1978, Japanese Patent Application Laid-open No. 187345/1982, and Japanese Patent Application Laid-open No. 187346/1982. From the contents of these publications, it is clear that a desirable resin composition is not obtained when the rubber-reinforced polystyrene component used therein contains rubber particles of smaller diameters.

To meet the aforementioned market's demand for an improved rubber-reinforced polystyrene possessing a balanced set of outstanding properties, it is necessary to offer an improved rubber-reinforced polystyrene which exhibits outstanding and balanced performance in impact strength, gloss, tensile strength, and heat resistance.

The method which comprises polymerizing a styrene monomer solution containing a rubbery substance thereby making particles of the rubbery substance, bulk polymerizing the resulting composite until the produced particles of rubbery substance acquire stable diameters, and switching the proceeding bulk polymerization to suspension polymerization has been known to the art. The method which adds polystyrene before start of polymerization (Japanese Patent Publication No. 19352/1966, U.S. Pat. No. 3,488,743), the method which adds polystyrene while the polymerization is in progress and then continues the polymerization to make particles of the rubbery substance (Japanese Patent Publication No. 13983/1968, Japanese Patent Publication No. 21746/1968), and the method which polymerizes part of a styrene solution of the rubbery substance and then adds an additional supply of rubbery substane and optionally a styrene type polymer to make particles of the rubbery substance (Japanese Patent Publication No. 35074/1974) have been also known to the art. These methods invariably include a step of suspension polymerization. Besides, the method which adds polystyrene before the polymerization is started in either bulk-suspension polymerization or bulk polymerization (U.S. Pat. No. 3,144,420, for example) has been known to the art. Further, the method which mixes the rubbery substance particles with a separately prepared polystyrene solution and continues the polymerization without a catalyst (U.S. Pat. No. 3,676,527, U.S. Pat. No. 2,694,692) have been proposed.

It is, however, difficult to obtain a rubber-reinforced polystyrene type resin which produces molded articles of excellent appearance (gloss and coloring). It is far more difficult to obtain this resin by a method of continuous bulk polymerization. None of the methods of continuous bulk polymerization developed to date has succeeded in obtaining this resin with satisfactory performance.

SUMMARY OF THE INVENTION:

The inventors have continued a diligent study in search of a method for producing, by continuous bulk polymerization which enjoys various advantages, a rubber-reinforced polystyrene type resin capable of affording shaped articles of excellent appearance. They have consequently developed a novel method of production.

To be specific, the present invention concerns a composition which comprises a rubber-reinforced polystyrene possessing a specific microstructure uncommon to the conventional technique and a specific polydimethylsiloxane among other organic polysiloxanes.

More specifically, this invention is directed to a rubber-reinforced polystyrene composition having a rubbery polymer dispersed therein in the form of particles, which rubber-reinforced polystyrene composition is characterized in that:

(A) The dispersed particles have an average diameter in the range of 0.20 to 1.00 $\mu$,
(B) The dispersed particles of rubbery substance include therein polystyrene in the form of minute particles and not less than 80% of the minute polystyrene particles have diameters of not more than 0.3 $\mu$, and
(C) The composition contains 0.005 to 0.8% by weight of polydimethylsiloxane.

This invention, by combining all the requirements, (A), (B), and (C), has succeeded in obtaining a high-gloss rubber-reinforced polystyrene composition which exhibits a highly balanced set of outstanding properties.

DETAILED DESCRIPTION OF THE INVENTION:

To be more specific, the rubber-reinforced polystyrene is required to be such that it should possess a specific microstructure wherein the rubbery polymer is dispersed in the form of particles having an average diameter in the range of 0.20 to 1.00 $\mu$, more desirably 0.20 to 0.70 $\mu$, and most desirably 0.30 to 0.60 $\mu$. If the average diameter is less than 0.20 $\mu$, the impact strength is not sufficient. If the average diameter is more than 1.00 $\mu$, the gloss and the tensile strength are not sufficient. Thus, the produced resin does not exhibit a balanced set of properties.

The term "average particle diameter" as used herein refers to the diameter obtained by photographing an extremely thin specimen of a given rubber-reinforced polystyrene through a transmission electron microscope, measuring the diameters of 1,000 rubbery polymer particles selected from all the polymer particles appearing in the photograph, and calculating the following formula with respect to the outcome of the measurement mentioned above.

$$\text{Average particle diameter} = \frac{\Sigma n_i D_i^2}{\Sigma n_i D_i}$$

(wherein ni stands for the number of rubbery polymer particles having a diameter Di).

The average diameter of the rubbery polymer particles hinges upon the strength of the stirring during the polymerization, the viscosity of the solution of rubbery polymer to be used, and so on. Thus, the average particle diameter can be adjusted by suitably varying these factors.

The minute polystyrene particles included in the rubber particles dispersed in the rubber-reinforced polystyrene to be used in the present invention are required to possess heretofore inconceivable small diameters such that not less than 80% of the total number of minute polystyrene particles have diameters of not more than 0.3 $\mu$, preferably not less than 90% of the total polystyrene particles have diameters of not more than 0.3 $\mu$. When the included polystyrene particles have larger diameters, the produced resin is deficient in gloss, coloring, and rigidity and is incapable of exhibiting a balanced set of satisfactory properties.

The size of the included polystyrene particles can be found by photographing an extremely thin specimen of a given rubber-reinforced polystyrene through a transmission electron microscope and measuring the diameters of a specified number of polystyrene particles included in the rubber particles.

Desirably, the rubber-reinforced polystyrene for use in this invention is produced by a method which comprises polymerizing a solution consisting of a rubbery polymer and a styrene type monomer, mixing under strong shearing force the resulting polymer solution with a polymer solution obtained by polymerizing a styrene type monomer, and allowing the polymerization to continue further or a method which comprises increasing, in a polymer solution containing a rubbery polymer and a styrene type monomer, the proportion of the rubbery polymer in the ratio of the rubbery polymer to the styrene type monomer to a level higher than the level heretofore used generally.

Among various methods available for the preparation of the rubber-reinforced polystyrene, one particularly desirable method is as follows. This method is for continuous production of a rubber-reinforced polystyrene type resin, which is characterized by continuously feeding to a mixing machine a polymer solution (I) obtained by polymerizing a solution of a rubbery polymer dissolved in a styrene type monomer until the ratio of the rubbery polymer to the consequently formed polymer reaches a prescribed range and a polymer solution (II) obtained by polymerizing a styrene type monomer until the conversion surpasses a prescribed level, mixing the two polymer solutions at a high shear rate, and allowing the polymerization to proceed further at a prescribed fixed shear rate.

More specifically, this method is for continuous production of a rubber-reinforced polystyrene type resin, by the steps of continuously feeding to a mixing machine provided with a part capable of generating a high shear rate of not less than 130 sec$^{-1}$, preferably not less than 200 sec$^{-1}$, a polymer solution (I) obtained by polymerizing a solution consisting of 3 to 15% by weight of a rubbery polymer, 55 to 97% by weight of either a styrene type monomer or a mixture of a styrene type monomer with a monomer copolymerizable therewith, and 0 to 30% by weight of a solvent until the ratio of the consequently formed styrene type polymer to the rubbery polymer reaches a level in the range of 0.3 to 2.5, preferably 0.5 to 1.5 and a polymer solution (II) obtained by polymerizing a solution consisting of 70 to 100% by weight of either a styrene type monomer or a mixture of a styrene type monomer with a monomer copolymerizable therewith and 0 to 30% by weight of a solvent until the conversion reaches a level exceeding 45%, preferably exceeding 50%, thereby causing the rubbery polymer to be dispersed in the form of particles in the resulting mixture, then feeding the resulting composite to a stirring reactor provided with a part capable of generating a shear rate of not less than 20 sec$^{-1}$ and polymerizing the composite until the conversion reaches a level of exceeding 50%, optionally further continuing the polymerization in the presence or absence of shear, and thereafter removing unreacted monomers and the solvent.

In the method just described, the combination of the three requirements, i.e. the requirement that the ratio of the styrene type polymer or copolymer to the rubbery polymer in the polymer solution (I) containing the rubber polymer should fall in the range of 0.3 to 2.5, preferably 0.5 to 1.5, the requirement that the conversion of the polymer solution (II) should exceed 45%, preferably 50%, and the requirement that the mixer should be capable of generating a high shear rate of not less than 130 sec$^{-1}$, preferably not less than 200 sec$^{-1}$ proves effective. When this combination is fulfilled, the produced resin is enabled to give molded articles excelling in appearance, particularly in gloss and coloring. If the ratio of the styrene type polymer or copolymer to the rubbery polymer in the polymerization solution (I) is larger than the upper limit, the molded articles of the produced resin exhibit very poor coloring. If the ratio is smaller than the lower limit, required control of the condition of dispersion of the rubber particles is not obtained and the molded articles of the produced resin have poor gloss. If the polymerization ratio of the polymer solution (II) is lower than the lower limit, the control of the condition of dispersion of the rubber particles is not obtained even when the mixer gives a high shear rate as required and, as the result, the molded articles of the produced resin are deficient in gloss and coloring. It is further essential that the mixer should be capable of generating a high shear rate. When the shear rate is sufficiently high, the molded articles of the produced resin excel in gloss and coloring. It is necessary that after the mixing in the mixer is completed, the polymerization should be continued with a shear rate of not less than 20 sec$^{-1}$ until the conversion exceeds 50%. If the shear rate is lower than the lower limit, the produced resin does not give molded articles excelling in gloss.

The term "rubbery polymer" as used in this invention embraces conjugate 1,3-dienes of 4 to 6 carbon atoms such as homopolymer of 1,3-butadiene, copolymer of 1,3-butadiene with isoprene, and copolymers of 1,3-butadiene alone or 1,3-butadiene plus isoprene with other copolymerizable compounds such as styrene, nuclear alkyl-substituted styrenes such as methyl styrene, dimethyl styrene, acrylonitrile, methacrylonitrile, and alkyl esters of acrylic acid and methacrylic acid. One member or a mixture of two or more members selected from the group just mentioned is used as a rubbery polymer. Among the rubber polymers cited above, polybutadiene rubber and butadiene-styrene copolymer rubber are particularly desirable.

Examples of the styrene type monomer to be used in the present invention include styrene and nuclear alkyl-substituted styrenes such as o-methyl styrene, p-methyl styrene, m-methyl styrene, 2,4-dimethyl styrene, ethyl styrene, and p-tert-butyl styrene; α-alkyl-substituted styrenes such as α-methyl styrene and α-methyl-p-methyl styrene; nuclear-halogenated styrene such as o-chlorostyrene, m-chlorostyrene, p-chlorostyrene, p-bromostyrene, 2-methyl-1,4-chlorostyrene, and 2,4-dibromostyrene; and vinyl naphthalene. One member or a mixture of two or more members selected from the group cited above is used as a styrene type monomer.

Examples of the monomer capable of copolymerizing with the styrene type monomer include vinyl cyan compounds such as acrylonitrile and methacrylonitrile; methacrylic esters such as methyl methacrylate; acrylic esters; methacrylic acid; acrylic acid; maleic anhydride; and maleimides such as phenyl maleimide. One member or a mixture of two or more members selected from the group cited above is used as a monomer for copolymerization with the styrene type monomer.

Examples of the solvent usable effectively in this invention include aromatic hydrocarbons such as toluene, xylene, and ethylbenzene. One member or a mixture of two or more members selected from the above-mentioned is used as a solvent. Other solvent selected from among aliphatic hydrocarbons and dialkyl ketones may be used in combination with the aforementioned aromatic hydrocarbons on the condition that the separation of the polymerization product from the rubbery substance and the styrene type monomer is not impeded. The rubbery substance is dissolved in a concentration falling in the range of 3 to 15% by weight in the styrene type monomer or the mixture of the styrene type monomer with the solvent.

The solvent is used in an amount falling in the range of 0 to 30% by weight. If this amount exceeds 30% by weight, the conversion is heavily lowered and the produced resin suffers from a heavy decline of impact strength. Further, the energy required for the recovery of the used solvent increases to the extent of impairing the economy of the production. This solvent may be added after the conversion of polymerization has reached a level at which the viscosity of the polymerization system rises to a high degree or it may be added prior to the polymerization. For the sake of the uniformity of product quality and the ease of control of the polymerization temperature, it is desirable to add 5 to 15% by weight of the solvent to the polymerization system before the start of the polymerization.

In the preparation of the polymer solution (I) and the polymer solution (II) by the polymerization of respective monomers, the polymerization can be carried out in the absence of a polymerization initiator at a temperature in the range of 100° to 180° C. Otherwise, it can be carried out in the presence of an organic peroxide capable of generating a radical as a polymerization initiator at a temperature in the range of 50° to 180° C., preferably in the range of 90° to 140° C.

For the purpose of enabling the produced resin to excel in coloring and impact strength, the polymerization is desired to be carried out in the presence of an organic peroxide as contained in the rubbery substance.

Examples of the organic peroxide to be effectively used in the present invention include peroxy ketals such as 2,2-bis(t-butylperoxy)butane, 2,2-bis(t-butylperoxy)octane, 1,1-bis(t-butylperoxy)3,3,5-trimethylcyclohexane, 1,1-bis(t-butylperoxy)-cyclohexane, and n-butyl-4,4-bis(t-butylperoxy)pivalate; dialkyl peroxides such as di-t-butyl peroxide, t-butylcumyl peroxide, dicumyl peroxide, α, α'-bis(t-butyl peroxyisopropyl)benzene, 2,5-dimethyl-2,5-di(t-butylperoxy)hexane, and 2,5-dimethyl-2,5-di(t-butylperoxy)hexyne-3; diacyl peroxides such as acetyl peroxide, isobutylyl peroxide, octanoyl peroxide, decanoyl peroxide, lauroyl peroxide, 3,5,5-trimethyl hexanoyl peroxide, benzoyl peroxide, 2,4-dichlorobenzoyl peroxide, and m-tolluoyl peroxide; peroxy dicarbonates such as di-isopropyl peroxy dicarbonate, di-2-ethylhexyl peroxy dicarbonate, di-n-propyl peroxy dicarbonate, di-myristyl peroxy dicarbonate, di-2-ethoxyethyl peroxy dicarbonate, di-methoxyisopropyl peroxy dicarbonate, and di(3-methyl-3-methoxybutyl) peroxy dicarbonate; peroxy esters such as t-butyl peroxy acetate, t-butyl peroxy isobutyrate, t-butyl peroxy pivalate, t-butyl peroxy neodecanoate, cumyl peroxy neodecanoate, t-butyl peroxy-2-ethylhexanoate, t-butyl peroxy-3,5,5-trimethylhexanoate, t-butyl peroxy laurate, t-butyl peroxy benzoate, di-t-butyl diperoxy isophthalate, 2,5-dimethyl-2,5-di(benzoylperoxy)hexane, and t-butyl peroxy isopropylcarbonate; ketone peroxides such as acetylacetone peroxide, methylethyl ketone peroxide, cyclohexanone peroxide, 3,3,5-trimethyl cyclohexanone peroxide, and methyl cyclohexanone peroxide; hydroperoxides such as t-butyl hydroperoxide, cumene hydroperoxide, diisopropylbenzene hydroperoxide, p-methane hydroperoxide, 2,5-dimethylhexane-2,5-dihydroperoxide, and 1,1,3,3-tetramethylbutyl hydroperoxide; polyacyl peroxides of dibasic acids, and polyperoxyesters of polyols with dibasic acids.

During the course of the polymerization, a chain transfer agent selected from among mercaptans, α-methylstyrene linear dimers, and terpinolene and antioxidant selected from among hindered phenols, hindered bis-phenols, and hindered tris-phenols such as, for example, 2,6-di-t-butyl-4-methylphenol, and stearyl-β-(3,5-di-t-butyl-4-hydroxyphenyl)propionate may be used as contained in the polymerization system.

The mixer to be used in the present invention is required to be capable of instantaneously mixing the polymerization solution (I) and the polymerization solution (II) at a high shear rate. For the produced resin to give molded articles excelling in coloring and gloss, the shear rate is required to be not less than 130 sec$^{-1}$, preferably not less than 200 sec$^{-1}$. This invention does not discriminate the mixer by its operating principle, so long as the mixer is capable of giving such a high shear rate as described above. Generally, a mixer provided with turbine-type, propeller-type, bar-type, paddle-type, or ribbon-type stirring blades and enabled to produce a high-speed rotation is utilized. In any event, it is important that the mixer should be designed so as to produce a high shear rate.

After the polymer solution (I) and the polymer solution (II) have been mixed at a high shear rate, the resulting mixture is continuously withdrawn from the mixer and supplied to the subsequent polymerization reactor, there to be further polymerized. In this case, it is necessary that a shear rate exceeding 20 sec$^{-1}$ should be given to the polymerization system until the conversion reaches a level exceeding 50%. If the shear rate is lower than the lower limit, the rubber particles produced have diameters distributed over a wide range and the molded articles of the produced resin are dificient particularly in gloss. The high shear strength imparted to the polymerization at this point constitutes itself an important factor for the purpose of conferring desirable properties upon the resin to be produced. Optionally, after the subsequent polymerization has been carried out in the presence or absence of shear strength, the produced resin is obtained by removing unreacted monomers and the used solvent under a vacuum at a temperature in the range of 180° to 260° C.

The polydimethyl siloxane to be used in the present invention is required to possess a structural unit represented by the formula:

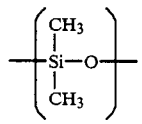

In the case of the rubber-reinforced polystyrene possessing rubber particles of such small diameters as contemplated by this invention, no desirable resin composition is obtained by using any conventionally known organic polysiloxane except for the polydimethyl siloxane. Preferably, the viscosity of the polydimethyl siloxane falls in the range of 10 to 10,000 centistokes at 25° C.

It is also important that the polydimethyl siloxane content in the rubber-reinforced polystyrene composition should fall in the range of 0.005 to 0.8% by weight. If this content is smaller than 0.005% by weight, the impact strength of the molded articles of the produced resin tends to be inferior. If this content exceeds 0.8% by weight, the molded articles of the produced resin are deficient in coloring and finishing characteristics (chemical adhesiveness, printability, and paintability for example). The reason for the deficiency of coloring and finishing characteristics brought about by an increase of the polydimethyl siloxane content remains yet to be elucidated. This deficiency may be logically explained by a supposition that the increase of the polydimethyl siloxane content possibly lowers the compatibility of the polydimethyl siloxane in the rubber-reinforced polystyrene. From this point of view, the polydimethyl siloxane content constitutes itsel an important factor for successful production of a desirable rubber-reinforced polystyrene composition.

This invention does not discriminate the production of the rubber- reinforced polystyrene composition particularly by the kind of the method to be adopted. The production can be attained by adding polydimethyl siloxane to styrene monomer and polymerizing the resulting mixture or by melting and mixing rubber-reinforced polystyrene and polydimethyl siloxane by the use of an extruder, for example. Optionally, the production may be affected by preparing master pellets of a high polymethyl siloxane concentration from polydimethyl siloxane and polystyrene, mixing the master pellets with a rubber-reinforced polystyrene, and molding the resulting mixture in a desired shape.

When the rubber-reinforced polystyrene composition is used as combined with a lubricant selected from among such metal salts of higher fatty acids as zinc stearate and calcium stearate and such amides of higher fatty acids as ethylenebisstearoamide, desirable results are obtained in terms of impact strength and gloss. The amount of the lubricant thus used is in the range of 0.01 to 1.0% by weight, preferably 0.01 to 0.2% by weight.

The rubber-reinforced polystyrene composition of the present invention may incorporate therein such additives as dye and pigment, lubricant, filler, mold release agent, plasticizer, and antistatic agent as occasion demands.

Further, the resin composition of the present invention exhibits a well-balanced performance in various physical properties such as impact strength, gloss, tensile strength, and thermal resistance. These properties are close to those of the ABS resin. The ability of the resin composition to take the place of the ABS resin amounts to a great economic merit and fully meets the demand from the market which is increasingly desirous of decreasing the wall thickness of molded products.

The resin composition of this invention can be used for the manufacture of molded articles in light electrical appliances, sundry goods, toys, etc.

The effects of the present invention are as follows.

In accordance with the present invention, by the method of continuous bulk polymerization, there can be produced a rubber-reinforced polystyrene type resin excelling in appearance properties such as coloring and gloss and exhibiting a balanced set of high desirable impact resistance and rigidity. Generally, impact resistance and coloring, impact resistance and gloss, and impact resistance and rigidity are contradicting pairs of properties. The merit derived from the fact that a resin excelling in all these properties is obtained by the highly economic method of continuous polymerization is enormous. The satisfactory coloring represents a literally profound commercial significance in that the cost of dye and pigment to be used for the coloring can be appreciably saved.

Now, the present invention will be described more specifically below with reference to working examples. The data reported in the working examples have been determined by the respective methods shown below.

Izod impact strength: The method specified by ASTM D-256 was used.

Tensile strength: The method of ASTM D-638 was adopted.

Gloss: The degrees of gloss in the gate part and the end gate part of a dumbbell test piece prepared by molding a given resin under the conditions of resin temperature of 220° C. and mold temperature of 45° C. were measured and the values of measurement were averaged.

Coloring: Black-colored molded samples (each measuring 89 mm in length, 50 mm in width, and 2.5 mm in thickness) were prepared by mixing 100 parts by weight of resin and varying fixed amounts of a black dye and molding the resulting black-colored resin mixtures. As control samples, black-colored molded samples were prepared by mixing a rubber-reinforced polystyrene containing 9% by weight of polybutadiene with dye. A given resin was compared with these samples and ranked with respect to color tone and color feeling.

Black-colored molded pieces prepared by adding ￥25, ￥20, and ￥15 worth of dye to 1 kg of natural-colored rubber-reinforced polystyrene and molding the resulting mixtures were used as control samples A, B, and C.

| Rank | Definition |
| --- | --- |
| 5 | Appearing darker than Sample A |
| 4 | Appearing equal to Sample A |
| 3 | Appearing intermediate between Samples A and B |
| 2 | Appearing equal to Sample B |
| 1 | Appearing intermediate between Samples B and C |
| 0 | Appearing equal to Sample C |

Shear rate: The shear rate ($=S \div r$) was calculated from the speed of rotation, S mm/sec, of the leading end of the projection or stirring blade of a rotor and the clearance, r mm, from the leading end of the projection or stirring blade to the machine wall.

EXAMPLE 1:

Preparation of polymer solution (I)

In 80% by weight of styrene monomer and 8% by weight of ethylbenzene, 12% by weight of polybutadiene rubber was dissolved. A solution consisting of 100 parts by weight of the resulting solution, 0.06 part by weight of 1,1-bis(t-butylperoxy)cyclohexane, and 0.15 part by weight of polydimethyl siloxane having viscosity of 500 centistokes was continuously fed into a first reactor at a feed rate of 2 liters/hr and polymerized therein at a temperature of 95° C. until the ratio of polystyrene to rubber reached 0.8, to produce the polymer solution (I).

Preparation of polymer solution (II)

A solution formed of 100 parts by weight of a solution consisting of 90% by weight of styrene monomer and 10% by weight of ethylbenzene and 0.06 part by weight of 1,1-bis(t-butylperoxy)cyclohexane was continuously fed at a feed rate of 1 liter/hr to a second reactor and polymerized therein at a temperature in the range of 95° to 110° C. until the conversion reached 65%, to produce the polymer solution (II).

The polymer solution (I) and the polymer solution (II) were continuously taken out of the first reactor and the second reactor, continuously fed to a mixer provided with a rotor containing a projection. Under continued exertion of shear rate of 1800 sec$^{-1}$ (revolution number of rotor 1,150 rpm) the polymer solution (I) and the polymer solution (II) were mixed. The resulting mixed solution was fed to a third reactor and polymerized under exertion of shear rate of 50 sec$^{-1}$ until the conversion reached 62%. Then, the solution introduced into a fourth reactor was further polymerized until the conversion rose to 90%. The resulting polymer solution was fed to an extruder provided with two vents and melted therein at 230° C. under a vacuum, with the volatile component expelled. From the die, molten strands were drawn out, cooled with cold water and chopped with a cutter to obtain pellets of resin. The physical properties of the produced resin are shown in Table 1.

EXAMPLES 2-4:

Resins were obtained by following the procedure of Example 1 except that a mixer provided with ribbon-type stirring blades was used and the shear rate was changed to 900 sec$^{-1}$ (Example 2), a mixer provided with multistage turbine-type stirring blades was used and the shear rate was changed to 350 sec$^{-1}$ Example 3), or the shear rate was changed to 250 sec$^{-1}$ (Example 4). The results are shown in Table 1.

COMPARATIVE EXPERIMENT 1:

In 10% by weight of ethylbenzene, 7.2% by weight of polybutadiene rubber and 82.8% by weight of styrene monomer were dissolved. A solution formed of 100 parts by weight of the resulting solution, 0.06 part by weight of 1,1-bis(t-butylperoxy)cyclohexane, and 0.125 part by weight of polydimethyl siloxane having viscosity of 500 centistokes was continuously fed to a reactor provided with multistage turbine-type stirring blades and polymerized under exertion of shear rate of 40 sec$^{-1}$ until the conversion reached 61%. The resulting solution was fed to another reactor and polymerized therein until the conversion reached 90% and removed a volatile component similarly to Example 1 and processed to produce pellets of resin. The results are shown in Table 1.

The method used as described above for the preparation of rubber-reinforced polystyrene is one conventional method. The resin obtained by this method was inferior to that obtained by the method of this invention in terms of coloring and gloss and further in terms of rigidity.

COMPARATIVE EXPERIMENT 2:

A resin was obtained by following the procedure of Example 1 except that a mixer provided with ribbon-type stirring blades was used and the shear rate was changed to 60 sec$^{-1}$. The results are shown in Table 1. When the polymerization system was processed in the mixer of the aforementioned description under a lower shear rate, the rubber particles could not obtain sufficiently small diameters and the molded articles of the produced resin were deficient in gloss. The molded articles of this resin were inferior also in coloring to those of the resins obtained in the working examples of this invention.

COMPARATIVE EXPERIMENTS 3 AND 4 AND EXAMPLES 5 AND 6:

Resins were obtained by following the procedure of Example 4 except that the conversion of the polymer solution (II) was invariably changed to 50% and the ratio of polystyrene to rubber in the polymer solution (I) was changed to 0 (Comparative Experiment 3), 0.6 (EXAMPLE 5), 1.1 (Example 6), and 3.2 (Comparative Example 4) (with the conversion controlled by polymerization temperature). The results are shown in Table 1. It is noted from the results that the molded articles of the produced resins were deficient in coloring and gloss and also in rigidity when the ratio of polystyrene to rubber in the polymer solution (I) was higher than the upper limit. It is further noted that if the ratio of polystyrene to rubber was smaller than the lower limit, the rubber particles did not acquire sufficiently small diameters and the molded articles were greatly deficient in gloss even when the shear rate was amply high.

COMPARATIVE EXAMPLE 5:

A resin was obtained by following the procedure of Example 4 except that the conversion of the polymer solution (II) was lowered to 35%. The results are shown in Table 1. It is noted from the results that if the conversion of the polymer solution (II) was lower than the lower limit, the rubber particles did not acquire sufficiently small diameters and the molded articles of the produced resin were heavily deficient in gloss.

COMPARATIVE EXPERIMENT 6:

A resin was obtained by following the procedure of Example 5 except that the shear rate exerted on the polymer solution in the third reactor was changed to 5 sec$^{-1}$. The results are shown in Table 1. It is noted from the results that if the shear rate in the third reactor was lower than the lower limit, the molded articles of the produced resin were inferior in gloss and coloring to those of the resins of the present invention.

EXAMPLES 7–9 AND COMPARATIVE EXPERIMENTS 7–9:

In 8% by weight of ethylbenzene, 12% by weight of polybutadiene and 80% by weight of styrene monomer were dissolved. A solution consisting of 100 parts by weight of the resulting solution and 0.08 part by weight of 1,1-bis(t-butylperoxy)cyclohexane was continuously fed at a feed rate of 1.8 liters/hour to a first reactor and polymerized therein until the ratio of polystyrene to rubber reached 0.5, to obtain the polymer solution (I).

A mixed solution consisting of 90% by weight of styrene monomer and 10% by weight of ethylbenzene was continuously fed at a flow rate of 1 liter/hour to a second reactor and polymerized therein until the conversion reached 65%, to obtain the polymer solution (II).

The polymer solution (I) and the polymer solution (II) were continuously drawn out of the first and second reactors respectively and continuously fed to a mixer possessing a rotor provided with projections. In this mixer, the polymer solution (I) and the polymer solution (II) were mixed under continued exertion of shear rate of 1,800 sec$^{-1}$. The resultant mixed solution was fed to a third reactor and, under continued exertion of shear rate of 80 sec$^{-1}$, polymerized until the conversion reached 55%. The solution subsequently forwarded to a fourth reactor was polymerized until the conversion reached 80%. The resulting solution was fed to an extruder provided with the vents and melted therein at 230° C. under a vacuum, with a volatile component expelled, to obtain pellets of resin. This resin was mixed with polydimethyl siloxane and zinc stearate or polymethylphenyl siloxane added therein in varying amounts indicated in Table 2. The resulting mixtures were each melted and blended in an extruder, to obtain a resin composition. The results are shown in Table 2.

It is noted from the results that if the amounts of polydimethyl siloxane added were less than 0.002% by weight, the molded articles of the produced resins were deficient in Izod impact strength. If the amounts of polydimethyl siloxane added exceeded 0.8% by weight, the molded articles of the produced resins were deficient in coloring. When polymethylphenyl siloxane was used in the place of polydimethyl siloxane, the molded articles of the produced resins were deficient in Izod impact strength.

TABLE 1

| | Example | | | | Comparative Experiment | | | Example | | Comparative Experiment | | |
|---|---|---|---|---|---|---|---|---|---|---|---|---|
| | 1 | 2 | 3 | 4 | 1 | 2 | 3 | 5 | 6 | 4 | 5 | 6 |
| Polymerization conditions: | | | | | | | | | | | | |
| Ratio of polystyrene/rubber [of polymer solution (I)] | 0.8 | 0.8 | 0.8 | 0.8 | — | 0.8 | 0 | 0.6 | 1.1 | 3.2 | 0.8 | 0.6 |
| Conversion [of polymer solution (II)] (%) | 65 | 65 | 65 | 65 | — | 65 | 50 | 50 | 50 | 50 | 35 | 50 |
| Shear rate of mixer (sec$^{-1}$) | 1800 | 900 | 350 | 250 | — | 60 | 250 | 250 | 250 | 250 | 250 | 250 |
| Shear rate of third reactor (sec$^{-1}$) | 50 | 50 | 50 | 50 | — | 50 | 50 | 50 | 50 | 50 | 50 | 5 |
| Behavior of resin: | | | | | | | | | | | | |
| Diameter of rubber particles | 0.60 | 0.81 | 0.49 | 0.54 | 0.62 | 3.2 | 6.2 | 0.58 | 0.52 | 2.1 | 2.6 | 1.3 |
| Ratio of included polystyrene particles having diameters of not more than 0.3μ (%) | 90 | 87 | 95 | 93 | 70 | 68 | 95 | 95 | 90 | 78 | 83 | 80 |
| Izod impact strength (kg · cm/cm) | 10.8 | 11.3 | 10.2 | 10.5 | 10.8 | 7.3 | 6.1 | 10.3 | 10.4 | 8.7 | 9.7 | 10.3 |
| Tensile strength (kg/cm$^2$) | 370 | 360 | 375 | 370 | 320 | 280 | 220 | 370 | 360 | 320 | 320 | 340 |
| Gloss (%) | 90 | 88 | 93 | 91 | 78 | 45 | 35 | 90 | 93 | 52 | 48 | 65 |

TABLE 1-continued

|  | Example | | | | Comparative Experiment | | | Example | | Comparative Experiment | | |
| --- | --- | --- | --- | --- | --- | --- | --- | --- | --- | --- | --- | --- |
|  | 1 | 2 | 3 | 4 | 1 | 2 | 3 | 5 | 6 | 4 | 5 | 6 |
| Coloring | 5 | 5 | 5 | 5 | 2 | 2 | 4 | 5 | 5 | 3 | 4 | 4 |

TABLE 2

|  | Example | | | Comparative Experiment | | |
| --- | --- | --- | --- | --- | --- | --- |
|  | 7 | 8 | 9 | 7 | 8 | 9 |
| Polymerization conditions: | | | | | | |
| Ratio of polystyrene/rubber [of polymer solution (I)] | 0.5 | 0.5 | 0.5 | 0.5 | 0.5 | 0.5 |
| Conversion [of polymer solution (II)] (%) | 65 | 65 | 65 | 65 | 65 | 65 |
| Shear rate of mixer (sec$^{-1}$) | 1800 | 1800 | 1800 | 1800 | 1800 | 1800 |
| Shear rate of third reactor (sec$^{-1}$) | 80 | 80 | 80 | 80 | 80 | 80 |
| Additive: | | | | | | |
| Polydimethyl siloxane (% by weight) | 0.005 | 0.5 | 0.2 | 0.002 | 1.0 | polymethylphenyl siloxane 0.2 |
| Zinc stearate (% by weight) | — | — | 0.05 | — | — | — |
| Behavior of resin: | | | | | | |
| Diameter of rubber particles ($\mu$) | 0.57 | 0.57 | 0.57 | 0.57 | 0.57 | 0.57 |
| Ratio of included polystyrene particles having diameters of not more than 0.3$\mu$ (%) | 93 | 93 | 93 | 93 | 93 | 93 |
| Izod impact strength (kg · cm/cm) | 10.3 | 10.6 | 11.8 | 7.3 | 10.5 | 6.8 |
| Tensile strength (kg/cm$^2$) | 370 | 370 | 370 | 370 | 370 | 370 |
| Gloss (%) | 90 | 90 | 92 | 91 | 90 | 92 |
| Coloring | 5 | 4 | 5 | 5 | 1 | 5 |

What is claimed is:

1. A composition comprising a rubber-reinforced polystyrene, said rubber-reinforced polystyrene consisting essentially of
   (a) a rubbery polymer selected from the group consisting of a homopolymer of a 1,3-diene of 4 to 6 carbon atoms and a copolymer of a 1,3-diene of 4 to 6 carbon atoms with another copolymerizable monomer, and mixtures thereof; and
   (b) a polymer of a styrene-type monomer selected from the group consisting of styrene, nuclear alkyl-substituted styrenes, α-alkyl substituted styrenes, nuclear-halogenated styrenes and vinyl naphthalene, and mixtures thereof;
   said rubber-reinforced polystyrene having a rubbery polymer dispersed in the form of particles therein, and characterized in that:
   (A) said particles have an area-averaged particle diameter in the range of 0.49 to 1.00 micron,
   (B) said dispersed particles of rubbery substance have polystyrene included in the form of minute particles therein and not less than 80% of the total number of said polystyrene particles have diameters of not more than 0.3 micron, and
   (C) said composition contains polydimethyl siloxane in an amount falling in the range of 0.005 to 0.8% by weight.

2. A composition comprising a rubber-reinforced polystyrene, said rubber-reinforced polystyrene consisting essentially of
   (a) a rubbery polymer selected from the group consisting of a homopolymer of a 1,3-diene of 4 to 6 carbon atoms and a copolymer of a 1,3-diene of 4 to 6 carbon atoms with another copolymerizable monomer, and mixtures thereof; and
   (b) a polymer of
   (1) a styrene-type monomer selected from the group consisting of styrene, nuclear alkyl-substituted styrenes, α-alkyl-substituted styrenes, nuclear-halogenated styrenes and vinyl naphthalene, and mixtures thereof; and
   (2) a monomer selected from the group consisting of methacrylic esters, acrylic esters, methacrylic acid, acrylic acid, maleic anhydride and maleimides, and mixtures thereof;
   said rubber-reinforced polystyrene having a rubbery polymer dispersed in the form of particles therein, and characterized in that:
   (A) said particles have an area-averaged particle diameter in the range of 0.49 to 1.00 micron,
   (B) said dispersed particles of rubbery substance have polystyrene included in the form of minute particles therein and not less than 80% of the total number of said polystyrene particles have diameters of not more than 0.3 micron, and
   (C) said composition contains polydimethyl siloxane in an amount falling in the range of 0.005 to 0.8% by weight.

3. A composition according to claim 1 or 2, wherein not less than 90% of the total number of included polystyrene particles have diameters of not more than 0.3 micron.

4. A composition according to claim 1 or 2, wherein the viscosity of said polydimethyl siloxane is in the range of 10 to 10,000 centistokes at 25° C.

* * * * *